Patented Mar. 27, 1923.

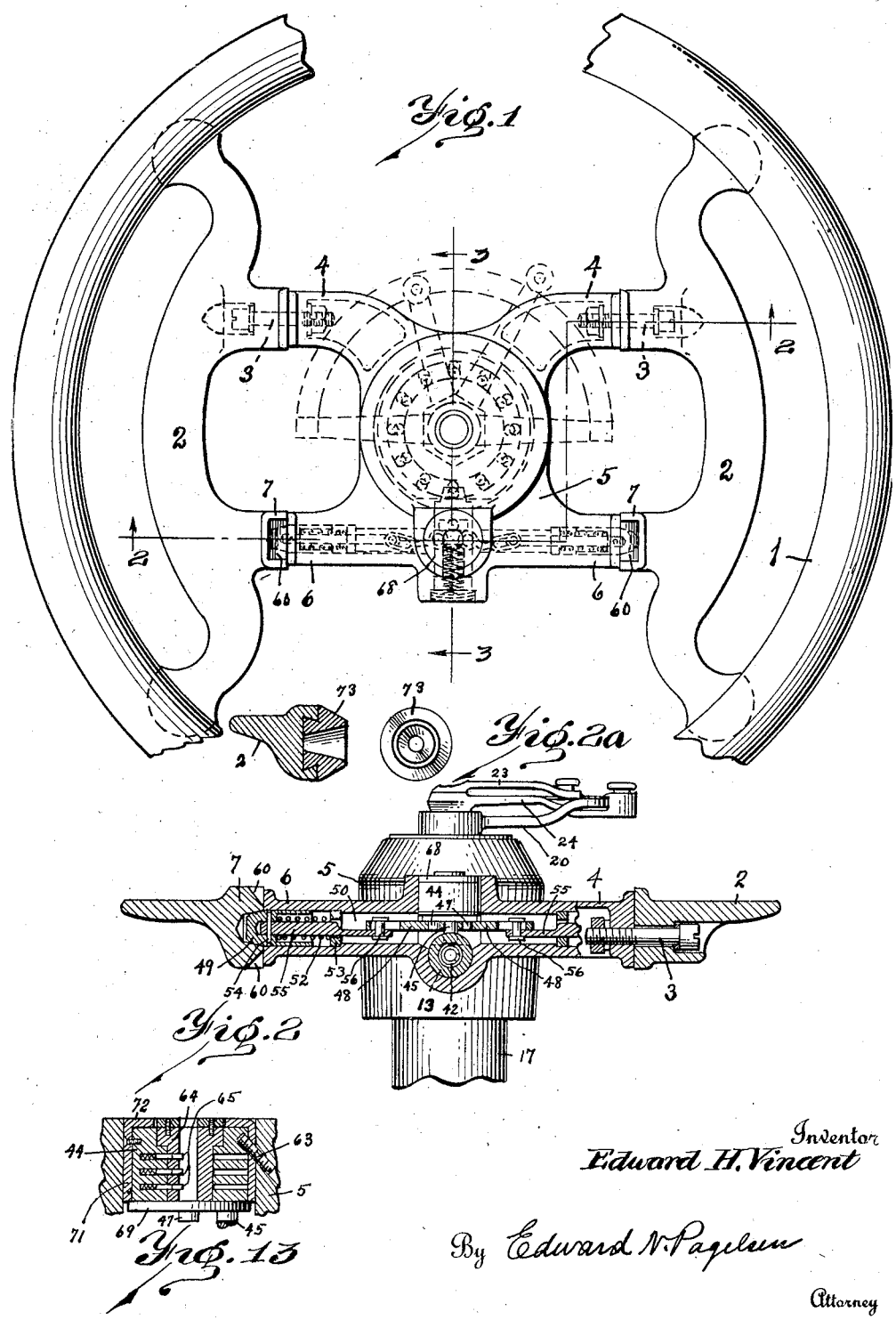

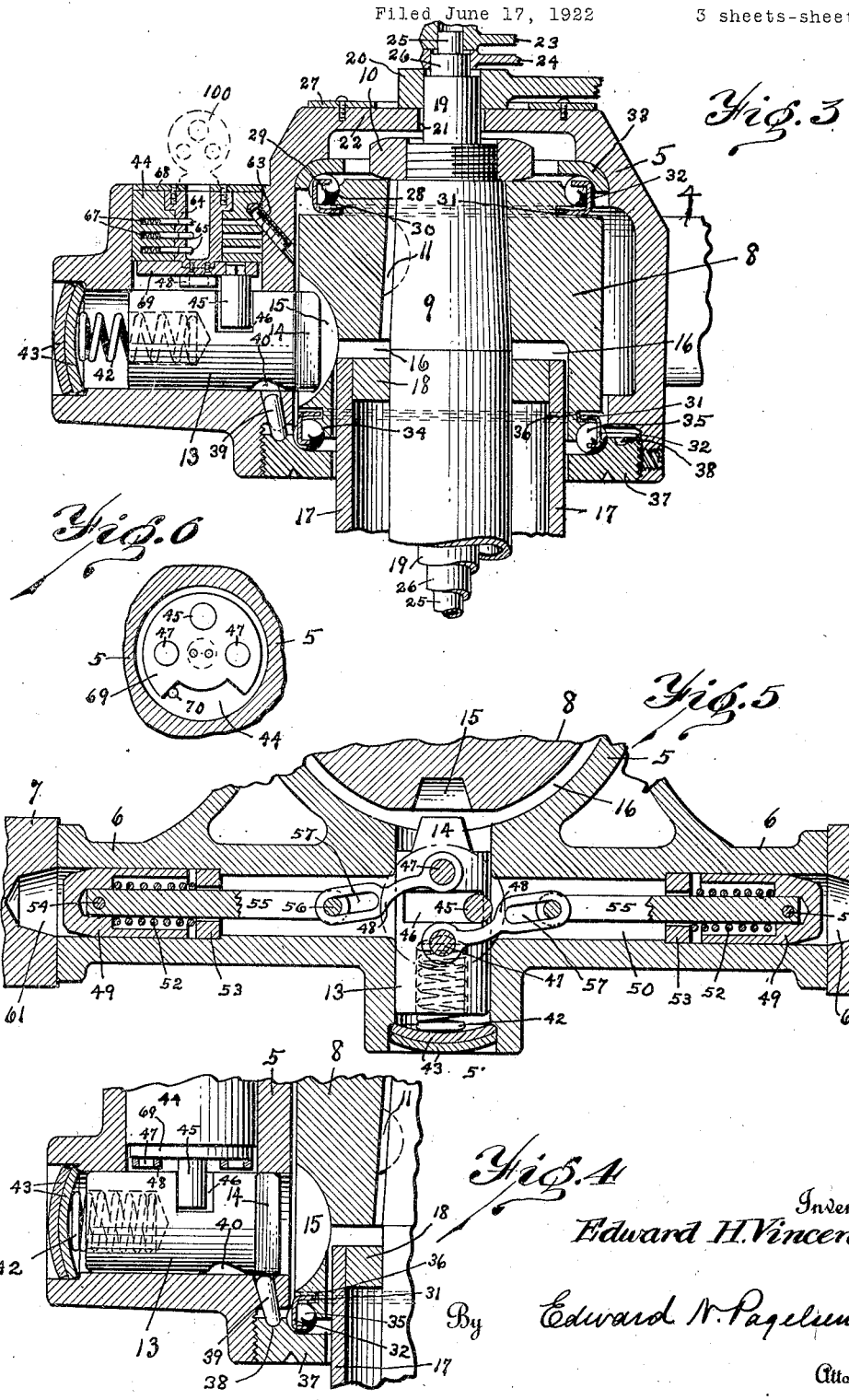

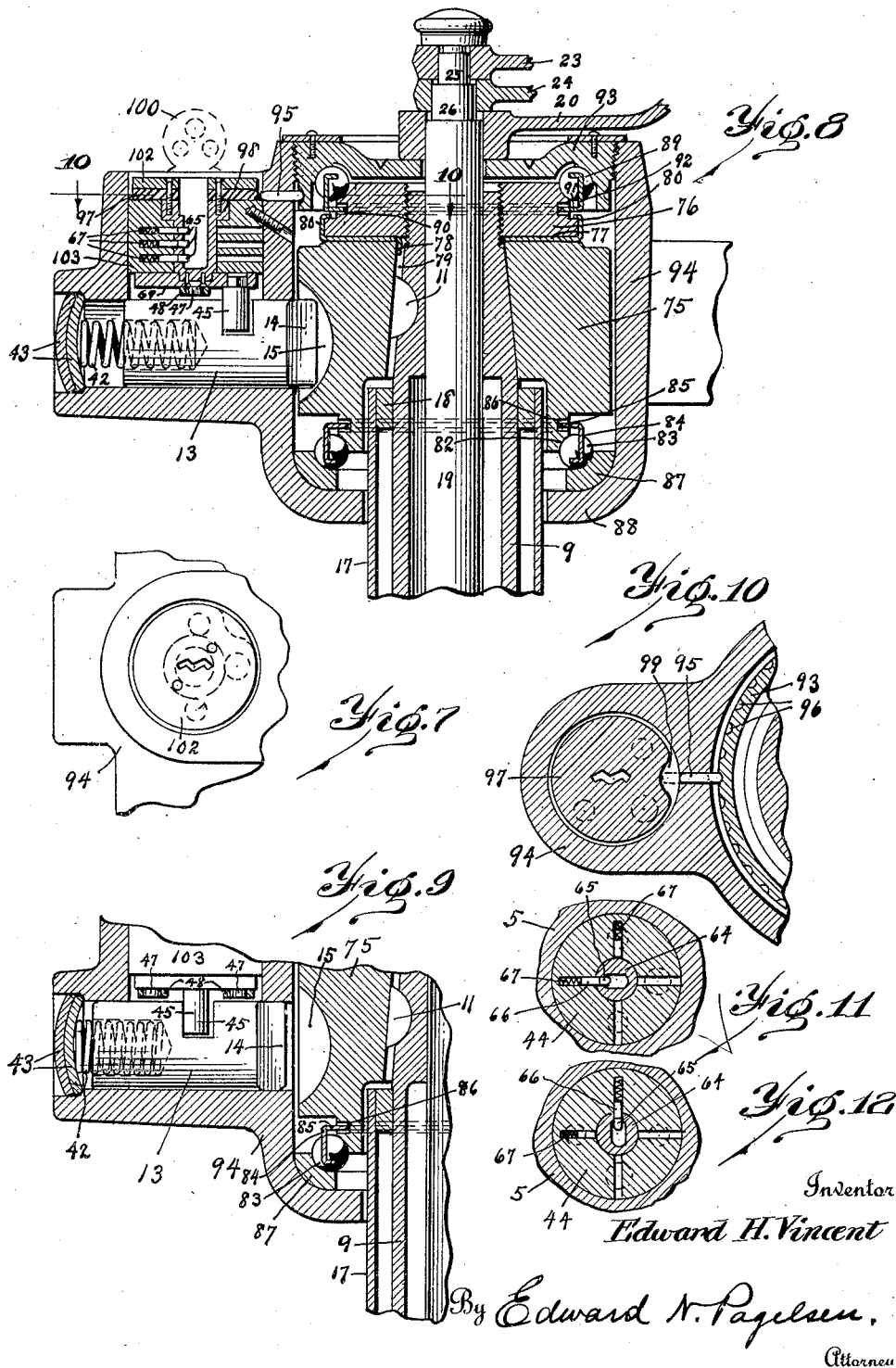

1,449,563

UNITED STATES PATENT OFFICE.

EDWARD H. VINCENT, OF DETROIT, MICHIGAN.

TILTING LOCKING STEERING WHEEL.

Application filed June 17, 1922. Serial No. 568,975.

*To all whom it may concern:*

Be it known that I, EDWARD H. VINCENT, a citizen of the United States, and residing at Detroit, in the county of Wayne and State of Michigan, have invented a new and Improved Tilting Locking Steering Wheel, of which the following is a specification.

This invention relates to the steering wheels for motor vehicles, and its object is to provide a wheel which can be locked to or unlocked from the steering shaft as may be desired and which cannot be made to turn the steering shaft when so unlocked.

Another object of this invention is to provide a steering head adapted to be locked to and unlocked from a steering shaft and a wheel rim tiltably mounted thereon, and a locking mechanism entirely enclosed in the steering head which can be positioned to lock the head to the steering post and which will at the same time position other mechanism so that when the wheel rim is moved to its regular operative position it will be locked in such position.

Another object of this invention is to provide a steering head adapted to be locked to and unlocked from a steering shaft, which can be drop-forged of hard steel and which can be readily machined.

Another object of this invention is to provide a steering head which can be locked to and unlocked from a collar secured to a steering shaft and which will entirely enclose the collar so that access thereto is entirely prevented, except after the release of instrumentalities through the actuation of a key-operated lock mounted in said steering head.

Another object of this invention is a steering head adapted to be locked to and unlocked from a steering shaft and a key-operated lock to control this locking and unlocking, the lock being so constructed that the key can be withdrawn to leave the steering head in either position, and a steering wheel rim pivoted on the head and adapted to be released to swing out of normal position when the wheel head is unlocked from the steering shaft.

In the accompanying drawings, Fig. 1 is a plan of this improved steering wheel. Fig. 2ª is a detail of a hard steel insert. Figs. 2 and 3 are sections on the lines 2—2 and 3—3 of Fig. 1 respectively. Fig. 4 is a partial section on the line 3—3 of Fig. 1 showing the locking bolt in withdrawn position. Fig. 5 is a transverse section of the steering wheel showing the locking pins for connecting the wheel head to the spider structure. Fig. 6 is an end view of the lock barrel. Fig. 7 is a view of the lock plate. Fig. 8 is a section similar to Fig. 3 of a modified form of steering wheel. Fig. 9 is a detail of the lock barrel in another position. Fig. 10 is a section on the line 10—10 of Fig. 8. Figs. 11 and 12 are transverse sections of the lock barrel showing it in two different positions. Fig. 13 is a longitudinal section of the lock.

Similar reference characters refer to like parts throughout the several views.

The wheel rim 1 (Fig. 1) is attached to the spider members 2 in any desired manner and the bolts 3 connect the spider members to the rear arms 4 of the wheel head 5. The spider members rotate on these bolts when the front arms 6 of the wheel head are disconnected from the sockets 7 on the spider members. The wheel head is rotatably mounted on a collar 8 shown in Fig. 3, the collar being held in position on the steering shaft 9 by a nut 10, being prevented from rotating on the shaft by the key 11. Slidably mounted in the head 5 is a locking bolt 13 whose inner end 14 is adapted to enter the notches 15 in the collar 8.

The collar 8 is formed with a recess 16 in its lower end into which the steering post tube 17 extends and a bushing 18 at the upper end of the post tube 17 serves as a bearing for the shaft 9. The stationary quadrant tube 19 extends up into the quadrant 20 through an opening 21 in the upper end 22 of the steering head, which so encloses the nut 10 that access thereto is impossible. The spark lever 23 and fuel lever 24 are shown attached to their respective tubes 25 and 26. The plate 27 on the steering head 5 is adapted to act as a name plate. The collar 8 is formed with a groove 28 to receive the bearing balls 29 and with a groove 30 to receive the in-turned flange 31 of the ball retainer 32. This construction is of advantage as there is no liability of the balls becoming misplaced while the wheel structure is being assembled. The bearing ring 33 is preferably made separate from the head 5 as it can be finished more easily when made separately.

The lower end of the collar 8 is formed with a groove 34 for balls 35 and with a groove 36 for the in-turned flange 31 of another ball retainer 32. The locking ring 37 screws into the lower threaded end of the head 5 and has notches or depressions 38 in its upper end to receive the pin 39 which is mounted in a hole in the steering head. When the locking bolt 13 is in its operative position shown in Fig. 3, the ring 37 can be turned, the notch 40 in the locking bolt permitting this pin 39 to move up and down as the notches or depressions 38 pass it, but when the locking bolt is in the position shown in Fig. 4, that is, when the steering mechanism is inoperative, the ring 37 is locked and the steering head cannot be removed from the bushing 8.

The locking bolt 13 is under pressure of the spring 42 which abuts against the spring plates 43. Mounted in the steering head 5 just above the locking bolt is a lock barrel 44 having an actuating pin 45 extending into a slot 46 in this locking bolt. Two other pins 47 also extend down from the lock barrel into the inner ends of the links 48 shown in Fig. 5. Locking pins 49 are slidable in the transverse hole 50 formed in the head 5 and its arms 6 and these pins are under pressure of the springs 52 which abut against the collars 53 in this hole. The stems 55 are attached to these pins 49 by means of the small pins 54 which may be inserted when the lock barrel 44 is removed from the head. The pins 56 at the inner ends of these stems extend into the elongated slots 57 in the links 48.

The lock barrel 44 is turned by a key 100 to the position shown in Fig. 5 to release the wheel structure from the collar 8 on the steering shaft 9 and to permit the spider structure to swing on the bolts 3. In this position the wheel is inoperative for steering purposes and can be turned and tilted to any designated position to permit free entrance of the driver to his seat. When the key is inserted, the spring 42 serves to turn the lock barrel ninety degrees, counter-clockwise or to the left, and the spring 42 forces the end 14 of the locking bolt into the notch 15 in the collar 8. This also permits the springs 52 to force the locking pins 49 into the sockets 7.

If the rim is tilted down or up when the lock is turned as stated, the locking pins 49 will project from the arms 6 on the steering head, and when the rim and its spider structure are swung to normal position, the inclines 60 on the upper and lower sides of the sockets 7 engage the ends of the locking pins 49 and push them back until the recesses 61 come into alinement with these pins when the springs 52 force the pins into the recesses 61 in these sockets. This movement of the locking pins is permitted by the slots 57.

The lock is preferably of the "Yale" type having a cylindrical body 44 which may be secured in position by the screw 63 shown in Fig. 3. The locking plug 64 has the usual locking pins 65 and the spring held tumbler pins 66 are pressed inward by the springs 67. As shown in Figs. 11 and 12, there are two sets of these locking tumblers at right angles to each other so that the key may be withdrawn and the lock held at two positions, at one of which the locking bolt 13 is in its operative and at the other in its inoperative position. The plate 68 which holds the lock plug in position is of hardened steel to prevent injury to the lock. The end plate 69 which is attached to the lock plug carries the pins 45 and 47 and its movements is limited by the pin 70 shown in Fig. 6.

If desired, the lock barrel 44 may be enclosed in a hard steel covering, such as shown in Fig. 13, consisting of the shell 71 and the end 72. The sockets 7 of the spider structure may be formed with hardened bushings 73 shown by Fig. 2ª which will be secured in any desired manner, preferably by placing them in the mold and pouring the metal of the spider arms around them.

In the modification shown in Fig. 8, part of the structure is reversed. The steering post 17 has the bushing 18 to serve as a bearing for the steering shaft 9 through which the quadrant tube 19, fuel control tube 26 and spark control tube 25 extend. At the upper ends of these tubes are the quadrant 20 and the levers 23 and 24. The collar 75 is secured to the steering shaft by the key 11 and has a notch 15 to receive the reduced end 14 of the locking bolt 13. A nut 76 screws onto the steering shaft and is prevented from turning relative thereto by the washer 77 which has a tongue 78 extending into the key seat 79 in the collar 75 and also has tongues 80 adapted to be bent up against the nut.

The lower end of the collar 75 is formed with a groove 82 to receive the bearing balls 83 which are held in position by the retainer 84 having a flange 85 which extends into the groove 86 in the collar. These balls also bear on the ring 87 which is positioned by the flange 88 of the steering head 94. The nut 76 is also formed with a groove to receive the bearing balls 89 and with a groove 90 to receive the flange 91 of the ball retainer 92. These balls also bear on the closure 93 which screws into the upper end of the steering head 94 and is prevented from rotating therein by the pin 95 which enters one of the notches 96 in this closure and is held there by a notched disk 97 on the lock plug 98 when the locking bolt 13 is withdrawn. This disk 97 has a notch 99 (Fig. 10) which registers with this pin 95 when the locking plug 98 is turned to proper position.

When the steering head is free to rotate on the steering shaft, the closure 93 is held from turning. But when the proper key 100 is inserted in the lock plug 98 and that is turned to the proper position, then the pin 95 can enter the notch 99 and free the closure. In other words, a person holding the key 100 which can lock the steering wheel to the steering shaft can also release the closure to permit the steering wheel to be entirely removed from the steering shaft. This is also the case in the construction shown in Figs. 1, 2 and 3.

In order to prevent tampering with the pin 95, a disk 102 of hard steel is secured to the lock plug 98 outside of the disk 97. The lock barrel 103 is similar to the lock barrel 44 above described and is held in position by a screw 63. The operation of this lock need not be further described. The wheel head in both cases is preferably made of drop forged steel properly hardened and the ring 37 and closure 93, the disks 43 which retain the spring 42, and all other exposed parts are of similar material.

The details of construction and the proportions of the parts of this device may all be changed by those skilled in the art without departing from the spirit of my invention as set forth in the following claims.

I claim:—

1. In a steering wheel, the combination of a steering shaft and a steering head rotatably mounted thereon, a locking bolt slidable in the head to lock the head to the steering shaft, a steering wheel rim pivoted to the head and adapted to swing out of normal position, locking means to hold the rim in operative position relative to the head, and a key operative lock to simultaneously release the locking means for the head and for the rim.

2. In a steering wheel, the combination of a steering shaft and a steering head rotatably mounted thereon, a locking bolt slidable in the head to lock the head to the steering shaft, a steering wheel rim pivoted to the head, locking pins movable parallel to the pivots for the rim to prevent the wheel from swinging relative to the head, a key operated lock, and means connecting the lock to said bolt and pins whereby the operation of the lock by its key will withdraw the locking bolt and locking pins and release the steering head from the steering shaft and release the rim from the head so it may swing freely relative thereto.

3. In a steering wheel, the combination of a steering shaft and a steering head rotatably mounted thereon, a locking bolt slidable in the head to lock the head to the steering shaft, a steering wheel rim pivoted to the head, locking pins movable parallel to the pivots for the rim to prevent the wheel from swinging relative to the head, a key operated lock, means connecting the lock to said bolt and pins whereby the operation of the lock by its key will withdraw the locking bolt and locking pins and release the steering head from the steering shaft and release the rim from the head so it may swing freely relative thereto, and springs to move the locking bolt and locking pins to operative position when the lock is released by the insertion of the key.

4. In combination with a steering shaft and a head rotatably mounted thereon, a steering wheel structure movable on said head, means by which the shaft and the wheel structure may be simultaneously or consecutively locked to said head and a key operated lock to positively lock said means against disengagement.

5. In combination with a steering shaft and a head rotatably mounted thereon, a steering wheel structure movable on said head, means mounted entirely within the head by which the shaft and the wheel structure may be simultaneously or consecutively locked to said head and means to positively prevent disengagement of said first mentioned means.

6. In combination with a steering shaft and a head rotatably mounted thereon, a steering wheel structure movable on said head, pins mounted entirely within the head by which the shaft and the wheel structure may be simultaneously or consecutively locked to said head, and a key operated lock to prevent disengagement of said pins.

7. In combination with a steering shaft and a head mounted thereon, a steering wheel structure mounted on said head, a key operated lock, and releasable means movable by the operation of the lock through its key to simultaneously allow the head rotary movement on the axis of the shaft and to permit movement of the wheel structure on the head, said means also permitting the shaft and wheel structure being simultaneously or consecutively locked to said head.

8. In combination with a steering shaft and a head mounted thereon, a steering wheel structure mounted on said head, a key operated lock, and releasable means mounted in the head and movable by the operation of the lock through its key to simultaneously allow the head rotary movement on the axis of the shaft and permit movement of the wheel structure on the head, said means also permitting the shaft and wheel structure being simultaneously or consecutively locked to said head.

9. In combination with a steering shaft and a head mounted thereon, a steering wheel structure mounted on said head, a key operated lock, and releasable means movable to one position by the operation of the lock to simultaneously allow the head rotary movement on the axis of the shaft and permit movement of the wheel structure on the head, and when said means are in another position permitting the shaft and wheel structure to be simultaneously or consecutively locked to said head.

10. In combination with a steering shaft and a head mounted thereon, a steering wheel structure mounted on said head, a key operated lock, releasable spring actuated means mounted in the head adapted when moved by the operation of the lock to one position to simultaneously allow the head rotary movement on the axis of the shaft and permit movement of the wheel structure on the head, and when said means is released by the insertion of a key in the lock and spring actuated to another position permit the shaft and wheel structure to be simultaneously or consecutively locked to said head.

11. In combination with a steering shaft and a head mounted thereon, a steering wheel structure mounted on said head, a lock, and releasable means adapted when moved by the operation of the lock to one position to simultaneously allow the head rotary movement on the axis of the shaft and permit movement of the wheel structure on the head, and when said means are in another position to lock the shaft to the wheel structure and simultaneously or subsequently lock the wheel structure to the head, said lock then holding said releasable means in inoperative position.

12. In combination with a steering shaft and a head mounted thereon, a steering wheel structure mounted on said head, and releasable means mounted in the head adapted when in one position to simultaneously allow the head rotary movement on the axis of the shaft and permit movement of the wheel structure on the head, and when said means is in another position permitting the shaft and wheel structure to be simultaneously or consecutively locked to said head, and means to positively lock said first mentioned means in either of said two positions in the head.

13. In combination with a steering shaft and a head mounted thereon, a steering wheel structure rotatably mounted on the head, a bolt mounted in the head to secure the head to the steering shaft, and adapted to be withdrawn to release the head from the steering shaft, spring actuated pins mounted in the head to lock the wheel structure to said head, and a lock to simultaneously withdraw the bolt and pins to inoperative position.

14. In combination with a steering shaft and a head mounted thereon, a steering wheel structure rotatably mounted on the head, a bolt mounted in the head to secure the head to the steering shaft and adapted to be withdrawn to release the head from the steering shaft, spring actuated pins mounted in the head to lock the wheel structure to said head, and a lock to simultaneously withdraw the bolt and pins to inoperative position, said lock when in another position adapted to hold the bolt in locking position and permit the pins to move to proper position to secure the wheel structure to the head.

15. In combination with a steering shaft and a head rotatably mounted thereon, a steering wheel structure movably mounted on said head, a rotatable key operated lock, and means movable from operative to inoperative position by the operation of said lock through its key to allow the head rotary movement on the shaft and permit movement of the wheel structure on the head.

16. In combination with a steering shaft and a head rotatably mounted on the axis of said shaft, a steering wheel structure movably mounted on said head, a key operated lock adapted for rotative movement, and means movable from operative to inoperative position by the rotation of said lock through its key to allow the head rotary movement on the axis of the shaft and permit movement of the wheel structure on the head.

EDWARD H. VINCENT.